March 23, 1954  C. W. HARRIS ET AL  2,672,945
TRANSDUCER HOUSING FOR SONIC APPARATUS
Filed Feb. 17, 1950

Inventor
Joseph M. Kime
Clyde W. Harris
By Robert W. Furlong Atty

March 23, 1954     C. W. HARRIS ET AL     2,672,945
TRANSDUCER HOUSING FOR SONIC APPARATUS
Filed Feb. 17, 1950     4 Sheets-Sheet 2
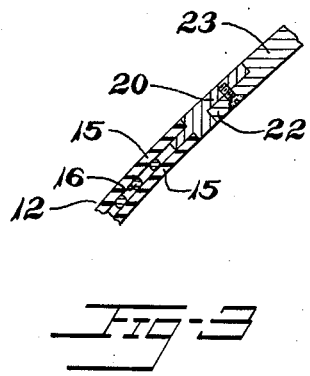
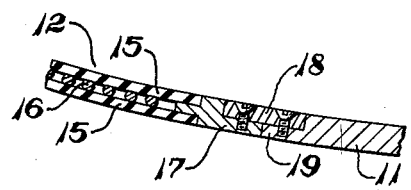
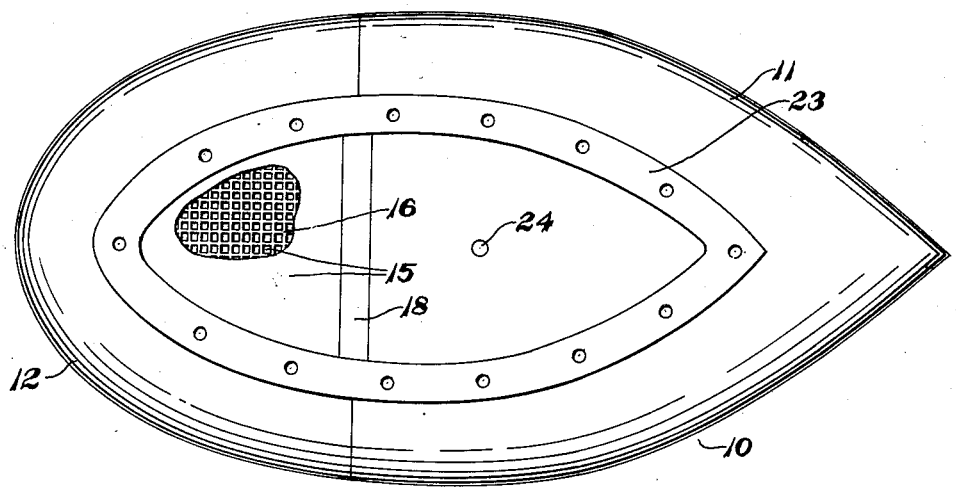
Inventor
Joseph M. Kime
Clyde W. Harris
By Robert W. Furlong Atty March 23, 1954     C. W. HARRIS ET AL     2,672,945
TRANSDUCER HOUSING FOR SONIC APPARATUS
Filed Feb. 17, 1950                              4 Sheets-Sheet 3
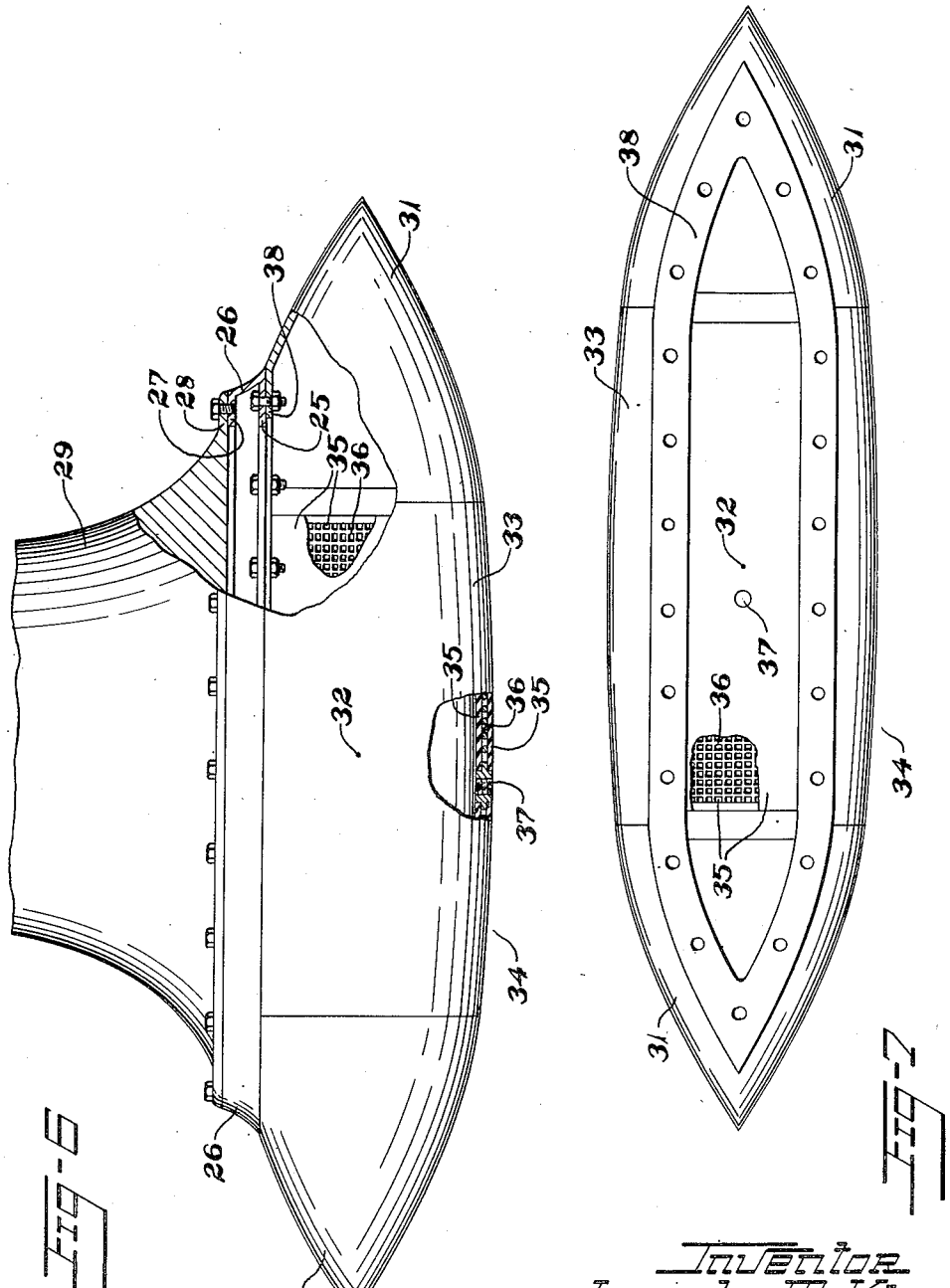

March 23, 1954   C. W. HARRIS ET AL   2,672,945
TRANSDUCER HOUSING FOR SONIC APPARATUS
Filed Feb. 17, 1950   4 Sheets-Sheet 4
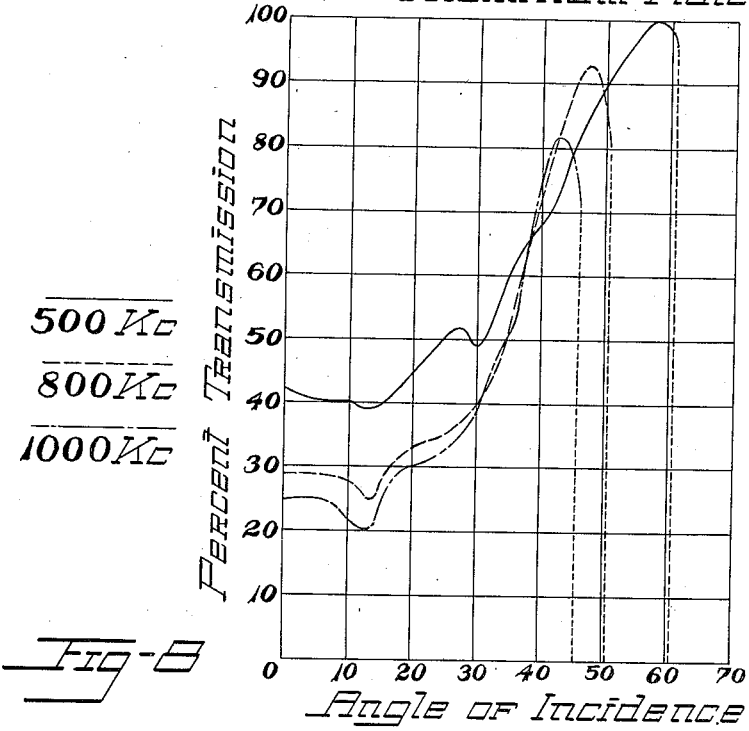
Fig-8
Percent Transmission of sound through a metal plate V. angle of incidence
0.031" Aluminum plate
500 Kc
800 Kc
1000 Kc
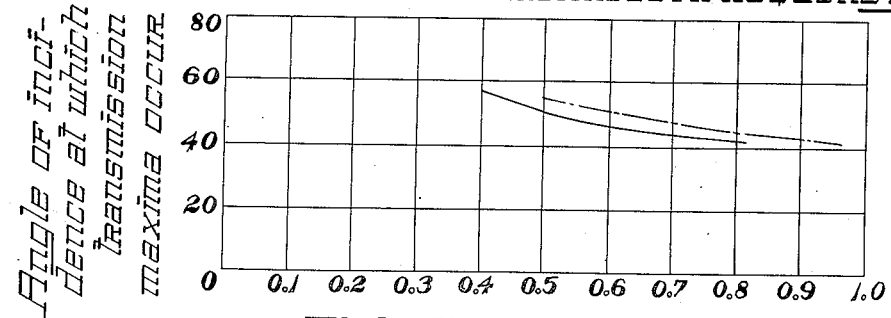
Fig-9   Angle of incidence at maximum transmission V. plate thickness X FREQUENCY
0.031" Aluminum
0.037" Steel
Inventor
Joseph M. Kime
Clyde W. Harris
By Robert W. Furlong Atty.

Patented Mar. 23, 1954

2,672,945

UNITED STATES PATENT OFFICE 2,672,945

TRANSDUCER HOUSING FOR SONIC APPARATUS

Clyde W. Harris, Socorro, N. Mex., and Joseph M. Kime, Akron, Ohio, assignors to The B. F. Goodrich Company, New York, N. Y., a corporation of New York Application February 17, 1950, Serial No. 144,624

5 Claims. (Cl. 181—0.51)

This invention relates to housings for sound transmitting and receiving apparatus and pertains more particularly to underwater transducer housings which enclose apparatus for determining the bearing and/or range of an object within the transmitting and receiving range of the transducer.

It is an object of this invention to provide a transducer housing which permits substantially all of the sound waves propagated against the walls of the housing to be transmitted through the walls of the housing into the surrounding medium.

It is also an object of this invention to provide an underwater transducer housing which will withstand external pressures normally exerted on the walls of the housing during submergence.

A further object of this invention is to provide an underwater transducer housing which when advanced through the water at speeds at which a ship travels does not cause disturbances in the water which seriously impair the operation of the sonic detecting apparatus.

Other objects of this invention will be apparent from the description and drawings which follow:

The general operation of underwater search apparatus comprises propagating a relatively narrow, conical beam of sound waves into the surrounding medium at frequent intervals and at numerous bearings, and detecting any sound waves reflected from objects foreign to the medium. At each "step" or interval the operator transmits a pulse of sound waves into the surrounding medium and waits for a return pulse reflected or echoed from an object foreign to the medium. If no sound waves are reflected to a receiving transducer which is located preferably in conjunction with a transmitting transducer or which may be the same transducer which transmitted the pulse of sound waves, the operator rotates the transmitting and receiving transducers to another bearing and continues to search. If sound waves are reflected from an object, such as a submarine, the reflected sound waves or echo is "picked-up" by the receiver transducer and the sound waves are transformed into audible and/or visual indications.

The transmitting and receiving transducers must be enclosed within protective housings for underwater use in order to prevent damage to the transducers and to provide a minimum of turbulence in the flow of water around the transducer. It is essential of course that the walls of the housing be as nearly transparent to sound as possible.

From the point of view of strength and simplicity of construction, the most satisfactory materials for the wall of such a housing would be one of the common structural metals such as iron, steel, aluminum, or alloys such as bronze, brass, etc. However, conventional housings with walls of such metals and with sufficient structural strength have in the past proven unsatisfactory because most of the sound striking such a wall was reflected and only a very small proportion if any was transmitted through it. For this reason it has been necessary to employ for the walls of the housing other materials, such as rubber, which are much more highly transparent to sound, even though they lack the other necessary mechanical properties and so require elaborate and expensive reinforcing structures to compensate for these defects.

We have now discovered that housings whose walls are highly transparent to sound may be constructed from common structural metals provided that the wall thickness is uniform and that the angle between the wall and a line from the wall to the sonic transmitter or receiver is substantially constant and within a certain specific range throughout the extent of the wall area.

In teaching this invention two embodiments of our invention are shown and described, however, it will be understood that the embodiments shown in the appended drawings and described herein are intended merely as illustrations of our invention and are not intended to limit the scope of this invention.

In the drawings:

Fig. 3 is a section in enlarged scale showing the juncture of the rubber body member of the housing shown in Fig. 1 to the flange on the securing lip of the housing;

Fig. 4 is a section in enlarged scale showing the junctures of the rubber body member and the metal body member of the housing shown in Fig. 1 to a joining band;

Fig. 5 is a plan view of the underwater transducer housing shown in Fig. 1;

Fig. 6 is a view in elevation partly broken away and in section of another embodiment of my invention together with a supporting member;

Fig. 7 is a plan view of the underwater transducer housing shown in Fig. 6;

Fig. 8 graphically indicates the variance in transmission of sound waves at various frequencies through an aluminum plate of a finite thickness as the angle of incidence which the sonic beam forms with the plate is varied; and Fig. 9 graphically indicates the variance of the angle of incidence at which transmission maxima occur for aluminum and steel plates of finite thickness as the product of plate thickness and frequency is varied.

Figure 1:
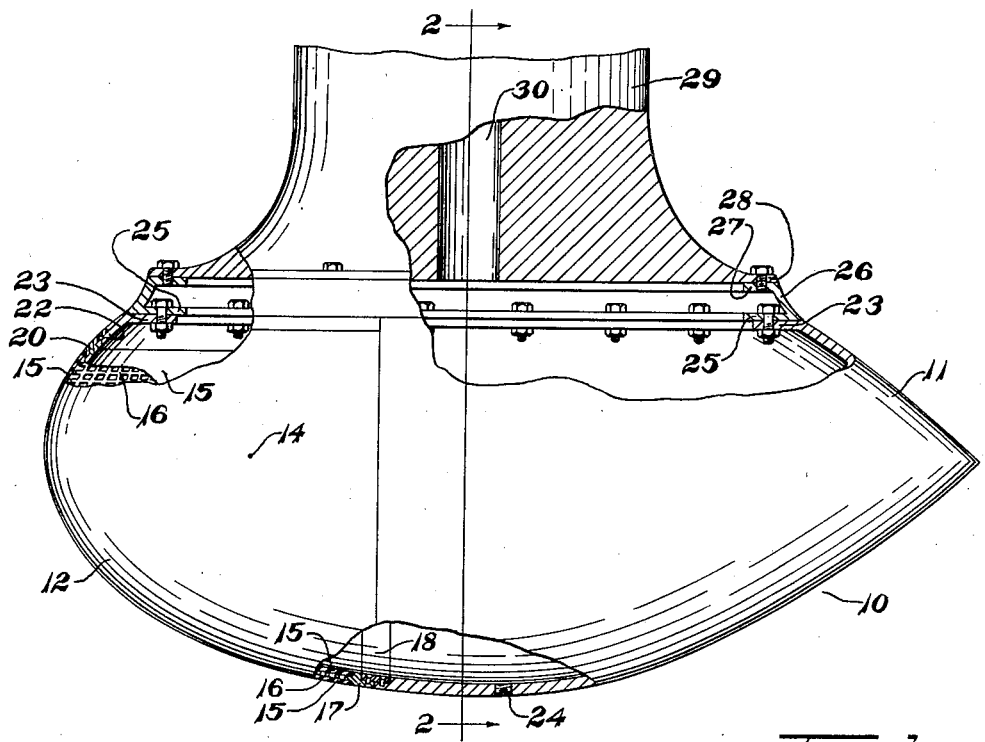
Fig. 1 is a view in elevation partly broken away and in section of an underwater transducer housing embodying our invention together with a supporting member.
Figure 2:
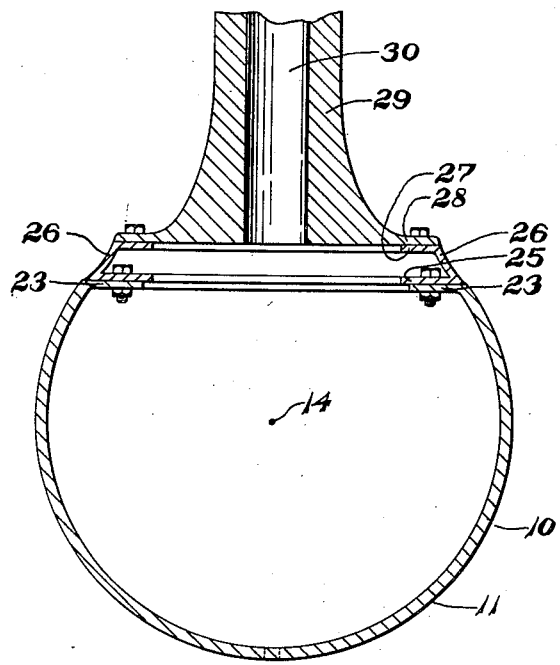
Fig. 2 is a section on line 2—2 of Fig. 1.

The underwater transducer housing 10 as shown in Fig. 1 is comprised of two sections, a metal wall member 11 and an acoustical rubber wall member 12. Since a transducer housing whose wall member is constructed entirely of metal and of a contour so that the wall surface of the housing forms substantially a constant angle with a line from the transducer does not provide a desired overall contour, it is preferable that a portion of the housing comprise an acoustical rubber wall member to provide a streamlined contour for the housing and to provide sufficient space within said housing to permit transmitting and receiving transducers to be properly mounted therein.

Metal wall member 11, as shown in Figs. 1 and 5, has a curvature which is nonspherical and streamlined such that the angle of incidence formed by a sonic beam emitted from or received by a transducer (not shown), whose center of emission is situated at position 14, with the curved surface of metal wall member 11 is substantially constant. A surface that maintains a constant angle with any radius vector radiating from a point may be constructed by rotating a segment of an equiangular spiral (having said point as a polar center) about a line passing through said point. The constant angle which a radius vector from the transducer forms with metal wall member 11 will vary in magnitude in transducer housings constructed in accordance with this invention depending upon the thickness of metal wall member 11, the particular metal from which metal wall member 11 is constructed, and the frequency of the sound waves.

The metal wall member 11 may be constructed of any metal or alloy which has sufficient structural strength when in the desired configuration to withstand the external forces exerted on the housing, such as iron, steel, aluminum, brass, etc. Although any appropriate method may be used to form the metal wall member 11, it is preferable, from a practical standpoint, to cast metal wall member 11 in a mold in the form of a single unitary element.

A portion of housing 10 is provided with an acoustical rubber wall member 12 as shown in Fig. 1 to provide a streamline contour for the entire outer surface of housing 10 and to provide sufficient space within housing 10 to properly mount the transmitting and receiving transducers. The rubber wall member 12 is constructed of conventional acoustical or "sound" rubber layers 15, 15, that is, rubber layers formed from a rubbery composition which transmits substantially all of the sound waves propagated against its surface, and is reinforced with a rigid grating or backing member 16. It is preferable that grating 16 be embedded between and adhered to layers of acoustical rubber, so that the latticework of grating 16 is not exposed to moisture which might weaken the metal because of corrosion. Satisfactory adhesion of the rubbery layers 15, 15 to grating 16 is obtained by vulcanizing the rubbery layers 15, 15 in contact with grating 16. Grating 16 may be constructed of any rigid reinforcing material, such as iron, steel, aluminum, brass, bronze, etc., which will not be deformed by forces normally exerted on housing 10.

Rubber wall member 12 is secured to metal wall member 11 by securing flange 17 on rubber wall member 12 to joining band 18, and securing flange 19 on metal wall member 11 to joining band 18; and rubber wall member 12 is secured along flange 20 to flange 22 on securing lip 23. It is preferable that securing lip 23 and metal wall member 11 be a single unitary element to provide maximum structural strength in housing 10. The heads of any rivets and/or bolts projecting from the outer surface of housing 10 are preferably removed, so that housing 10 has a smooth unbroken outer surface which minimizes cavitation or turbulent disturbances in the water caused when housing 10 is advanced through the water.

A removable plug 24 is provided in the bottom portion of housing 10 to provide a means for removing water from the interior of housing 10.

Bolting flange 25 of ferrule 26 is bolted to securing lip 23 of housing 10, and bolting flange 27 of ferrule 26 is bolted to securing flange 28 of supporting shaft 29.

Conduit 30 extending through supporting shaft 29 provides a passage for electrical wires, etc. that furnish energy to and receive energy from the sound transmitter and receiver.

In another embodiment of this invention, as shown in Fig. 6, metal wall members 31, 31 are constructed of a rigid metal or alloy, such as iron, steel, brass, aluminum, bronze, etc., and have a curvature which is nonspherical and streamlined, as shown in Figs. 6 and 7, such that a line from the point of emission 32 of a sonic beam emitted from a transmitting transducer (not shown) to any point on a metal wall member 31, 31 forms a constant angle with a tangent to the curved surface at that point. In this embodiment of this invention the two metal wall members 31, 31 are identical and may be formed by rotating a segment of an equiangular spiral about any radius vector of said spiral. The curvature of metal wall members 31, 31 is such that any radius vector originating at point 32 and intersecting a metal wall member 31 will form an angle of 33° with the tangent to the curved surface of the end section 31 at the point of intersection of the radius vector with the surface.

Center section 33 which provides a desired streamline contour to housing 34 without substantially decreasing the transmitting properties or strength of the underwater transducer housing 34 is constructed of conventional acoustical or "sound" rubber layers 35, 35 between which is embedded and adhered a reinforcing grating 36. Preferably the rubber layers 35, 35 are vulcanized to grating 36 forming an integral unit.

A removable plug 37 permits water to be drained from the interior of housing 34.

Center section 33 of housing 34 may be secured to metal wall members 31, 31 and securing lip 38 in the same manner as used in the embodiment of our invention shown in Fig. 1.

Securing lip 38 on housing 34 provides a means for attaching housing 34 to ferrule 26 which is in turn secured to supporting shaft 29.

To obtain satisfactory transmission of sound waves through the walls of the equiangular metal sections of the transducer housing, the transducer transmitter and receiver must be placed at a position corresponding to the polar center of construction of the equiangular spiral segment which forms the equiangular contour of the metal sections.

It is desirable that housings for underwater sonic apparatus be completely filled with water during the operation of the apparatus to obtain the optimum transmission of sound waves through the surrounding media.

If desired, the outer surfaces of the metal wall members may be covered with acoustical rubber to protect the metal from corrosion and/or to alter the contour of the transducer housing.

As previously mentioned, if a narrow sonic beam is propagated against a metal plate of uniform thickness, angles of incidence are observed at which transmission maxima occur depending upon the thickness of the plate, the frequency of the sonic waves, and the metal from which the plate is constructed. As shown in Fig. 8, an aluminum plate having a uniform thickness of 0.031 inch transmits all of the sonic waves having a frequency of 500 kilocycles when the sonic beam forms an angle of incidence of approximately 57° with the surface of the plate. As the frequency of the sonic waves is increased, the angle of incidence at which maximum transmission occurs, decreases, and when the sonic beam has a frequency of 800 kilocycles a transmission maximum of 92 percent at an angle of incidence of 47° is observed, and at a frequency of 1000 kilocycles a transmission maximum of 81 percent is observed at an angle of incidence of 40°. The curves illustrate that the angles of incidence for a desired sound wave frequency at which satisfactory transmission of sound waves through a metal plate occurs falls within a limited range depending upon the metal used to form the plate and the thickness of the metal plate. As the angle of incidence increases, the percentage of sound waves of a particular frequency transmitted through the metal plate decreases rapidly after the transmission maximum has been reached, and, as a certain angle of incidence is reached, the sound waves are totally reflected from the surface of the plate at which angle of incidence no transmission of the sonic waves through the plate occurs.

Sound waves are propagated in three modes, flexural vibrations, transverse vibrations, and longitudinal vibrations. In general, for each mode of propagation, different angles of incidence are observed at which transmission maxima occur when sound waves strike a metal plate of uniform thickness. It is preferable, however, that the surface curvature of the transducer housing be constructed such that the constant angle of incidence which the sonic beam forms with the surface of the housing be that at which maximum transmission through the metal plate is observed for sound waves propagated by flexural vibrations, since sound waves propagated by transverse and longitudinal vibrations often cause disturbances within the walls of the housing which interfere with the operation of the sonic detecting apparatus.

As shown in Fig. 9, the angles of incidence at which transmission maxima occur decrease with an increase in the product of plate thickness and sound wave frequency. It is obvious that for a particular angle of incidence and a particular metal, if the frequency of the sonic beam is substantially varied the thickness of the metal plate must also be varied, so that the product of plate thickness and frequency remain substantially the same, to obtain satisfactory sonic transmission through the housing.

To design a transducer housing in accordance with this invention, it is preferable that the following procedure be observed. Select the metal from which it is desired to form the metal wall member or members of the housing and the frequency range within which the sonic detecting apparatus is to operate. Experimentally determine the values of the product of frequency times plate thickness at which transmission maxima occur for that particular metal due to the propagation of sound by flexural vibrations. Select a desired angle of incidence at which a transmission maxima occurs and which, when used as the constant angle in the formation of an equiangular spiral, provides a satisfactory contour to the metal wall members of the housing when a segment of the spiral is rotated about a radius vector of the spiral. Referring to an appropriate graph, such as those shown in Fig. 9, and obtaining the appropriate value of the product of frequency times plate thickness, the required wall thickness for the metal section of the housing is readily determined by division of the maximum frequency of sonic transmission desired to be used into the product of frequency times thickness obtained from the graph.

It is obvious that transducer housings of numerous configurations may be constructed by merely choosing a different angle of incidence from which the equiangular spiral is constructed which determines the curvature of the metal section or sections of the transducer housing.

A transducer housing constructed in accordance with this invention has excellent properties for transmitting sonic waves of a desired frequency propagated against its surface, increasing the efficiency of the underwater detecting apparatus as compared to detecting apparatus enclosed in housings of conventional construction.

Equiangular metal wall members in a transducer housing constructed in accordance with our invention provide greater strength for the housing rendering the housing structurally stronger than housings of conventional construction having their walls constructed entirely of reinforced acoustical rubber.

It is clear that obvious variations and modifications may be made without departing from the spirit and scope of this invention as defined in the appended claims.

We claim:

1. An underwater-transducer housing which comprises a streamlined hollow rigid self-supporting sound-transmitting metal body member, said metal body member having a uniform wall thickness and having a curved surface conforming substantially in contour to a surface generated by the rotation of a segment of an equiangular spiral, that intersects all radii vector thereof at an angle substantially the same as an angle of incidence at which maximum transmission of sound waves propagated by flexural vibrations through a metal plate of the same metal as said metal body member and having the same wall thickness as said metal body member occurs, about a radius vector of said spiral.

2. An underwater-transducer housing which comprises a streamlined hollow rigid self-supporting sound-transmitting metal body member, said metal body member having a uniform wall thickness and having a curved surface conforming substantially in contour to a surface generated by the rotation of a segment of an equiangular spiral, that intersects all radii vector thereof at an angle substantially the same as an angle of incidence at which maximum transmission of sound waves propagated by flexural vibrations through a metal plate of the same metal as said metal body member and having the same wall thickness as said metal body member occurs, about a radius vector of said spiral, and a reinforced sound-transmitting acoustical rubber wall member.

3. An underwater-transducer housing which comprises a streamlined hollow rigid self-supporting sound-transmitting metal body member, said metal body member having a uniform wall thickness and having a curved surface conforming substantially in contour to a surface generated by the rotation of a segment of an equiangular spiral, that intersects all radii vector thereof at an angle substantially the same as an angle of incidence at which maximum transmission of sound waves propagated by flexural vibrations through a metal plate of the same metal as said metal body member and having the same wall thickness as said metal body member occurs, about a radius vector of said spiral, and an acoustical rubber wall member reinforced with a rigid material having a plurality of interstices therein.

4. An underwater-transducer housing which comprises a streamlined hollow open-ended rigid self-supporting sound-transmitting metal body member, said metal body member having a uniform wall thickness and having a curved surface conforming substantially in contour to a surface generated by the rotation of a segment of an equiangular spiral, that intersects all radii vector thereof at an angle substantially the same as an angle of incidence at which maximum transmission of sound waves propagated by flexural vibrations through a metal plate of the same metal as said metal body member and having the same wall thickness as said metal body member occurs, about a radius vector of said spiral, and a hollow reinforced open-ended sound-transmitting acoustical rubber body member secured to said metal body member along their margins to form a hollow unit.

5. An underwater-transducer housing which comprises a streamlined hollow open-ended rigid self-supporting sound-transmitting metal body member, said metal body member having a uniform wall thickness and having a curved surface conforming substantially in contour to a surface generated by the rotation of a segment of an equiangular spiral, that intersects all radii vector thereof at an angle substantially the same as an angle of incidence at which maximum transmission of sound waves propagated by flexural vibrations through a metal plate of the same metal as said metal body member and having the same wall thickness as said metal body member occurs, about a radius vector of said spiral, and a hollow open-ended sound-transmitting acoustical rubber body member reinforced with a rigid reticulate backing member, said metal body member and said acoustical rubber body member being secured together along their margins to form a hollow unit.

CLYDE W. HARRIS.
JOSEPH M. KIME.

References Cited in the file of this patent
UNITED STATES PATENTS

| Number | Name | Date |
|---|---|---|
| 2,403,990 | Mason | July 16, 1946 |
| 2,407,643 | Batchelder | Sept. 17, 1946 |
| 2,407,697 | Williams | Sept. 17, 1946 |
| 2,417,830 | Keller | Mar. 25, 1947 |
| 2,444,911 | Benioff | July 13, 1948 |
| 2,452,068 | Peterson | Oct. 26, 1948 |
| 2,460,274 | Benioff | Feb. 1, 1949 |
| 2,472,107 | Hayes et al. | June 7, 1949 |
| 2,519,360 | Dow | Aug. 22, 1950 |
| 2,575,339 | Fitzgerald | Nov. 20, 1951 |